Patented Sept. 5, 1950

2,521,437

UNITED STATES PATENT OFFICE 2,521,437

METHOD OF SOFTENING BUTADIENE-STYRENE COPOLYMER WITH PROPYLENE-DIOLEFIN COPOLYMER

David W. Young, Roselle, N. J., and Harris D. Hineline, Mount Vernon, N. Y., assignors to Standard Oil Development Company, a corporation of Delaware No Drawing. Application May 26, 1945, Serial No. 596,092

4 Claims. (Cl. 260—45.5)

This invention relates to emulsion interpolymers of butadiene and styrene, relates particularly to plasticizers and tackifiers for such interpolymers and relates especially to a plasticizer composition which simultaneously improves the modulus and increases the elongation at break without harmful reduction in tensile strength.

One of the more important substitutes for natural rubber is the synthetic polymer obtained by the copolymerization of butadiene and styrene in emulsion in the presence of a soap (to maintain the emulsion) and a peroxide type catalyst to promote the polymerization reaction. The resulting polymer shows a reasonably good tensile strength but has only a relatively fair modulus (that is, pounds per square inch pull to stretch a specimen to 300% of its original length) and an unduly low elongation at break. In addition, the material is much harder than natural rubber and much more difficult to process on the mill, and also it is seriously lacking in "tackiness."

To facilitate the processing of this polymer it is extremely desirable that a material be found which is compatible with the polymer, which can be milled thereinto without an unreasonable amount of effort; which will substantially soften the polymer, increase its tackiness and adhesiveness to permit of lamination of successive plies and after vulcanizing reduce the modulus and increase the elongation at break without loss of tensile strength. It is further desirable that the softener or plasticizer be capable of inter-curing with the polymer to become an integral part of the polymer molecule so as to be non-extractable. At the present time no softener has been found which will meet all of these requirements, or even meet a major portion of them.

According to the present invention a second, somewhat lower molecular weight polymer is prepared by a low temperature procedure from propylene and a multi-olefin within the molecular weight (or Staudinger number) range between about 2000 and 20,000. This polymer is a clear, water-white, more or less heavy to semi-solid oil which is easily made within the above indicated molecular weight range. The polymer also has a substantial amount of unsaturation as indicated by an iodine number varying from between about 5 to about 75. This polymer oil is then milled into the emulsion polymer in a proportion ranging from about 0.1% to 0.5% as the bottom limit and about 20% to 25% as the top limit. It is fully compatible with the butadiene-styrene interpolymer, forming an excellent solid solution therewith, yielding a very great softening effect, and markedly improving the tackiness, without interfering in any way with the subsequent vulcanization of the compounded polymer. In addition, the iodine number of the polymer oil is sufficiently large to permit it to be cross-linked by sulfur between molecules of the major polymer and thereby become chemically bound to the major polymer and highly resistant to extraction by solvents.

Thus, the process of the invention compounds into a butadiene-styrene polymer, a secondary polymer of propylene with a polyolefin to yield a compound which before curing is very soft and tacky, and after curing, is free from extractives and has a markedly improved modulus and elongated at break whereby its utility for rubber articles generally, and especially for tires and inner tubes, is very greatly improved. Other objects and details of the invention will be apparent from the following description.

The major component of the present invention is the emulsion interpolymer of a conjugated diolefin, usually butadiene, but alternatively isoprene, piperylene, dimethyl butadiene, and the like with a styrene-type compound which may be simple styrene or may be one or more of the various halogen substituted styrenes such as para chlor-styrene or 2,5-dichlor-styrene or the like. For the preparation of this polymer, a mixture is prepared of the diolefin and the styrene-type compound with the diolefin in a proportion ranging from 50 to 80 parts, with the styrene-type compound in proportion ranging from 50 to 20 parts. The mixture, especially if butadiene is used, is prepared under pressure in the presence of an amount of water 2 or 3 times as great as the amount of olefinic mixture; the water containing in addition from 0.5% to 5% of soap and from 0.1% to 3% (depending on the amount of diolefin present) of a peroxide-type catalyst such as hydrogen-peroxide, sodium peroxide, potassium persulfate, sodium perborate or the like. The mixture is stirred vigorously to maintain the hydrocarbon in a fine emulsion in the soap solution and the temperature is maintained within the range between about 20° C. and about 60° or 70° C. by heating or cooling the reactor, for a time interval ranging from about 8 hours to about 60 hours. During this time interval the reaction occurs at a good rate of speed to yield the desired interpolymer in emulsion form.

When the polymerization is substantially complete the pressure is released and the butadiene allowed to volatilize out. Thereafter the emulsion is steam stripped to remove any residual or unpolymerized styrene and the emulsion is then coagulated by the application thereto of approximate amounts of a suitable coagulating agent such as from 1% to 5% of acetic acid, or an approximate equal volume of saturated brine solution, or by saturation with carbon dioxide or the like. The coagulated polymer is then separated from the soap solution and washed on the open roll mill to remove as much as possible of the residual quantities of soap, catalyst and any unremoved traces of diolefin or styrene.

The plasticizing element of the present invention is prepared by mixing together from 90 parts to 99.5 parts of propylene with from 10 parts to 0.5 part of a multi-olefin such as the above listed substances. Either before or after mixing, the material is cooled to a temperature ranging from −40° to −103° C. The cooling may be obtained by the use of a refrigerating jacket upon the mixing or storage receptacle or upon the reactor. Alternatively, the cooling may be obtained by the direct admixture with the olefinic material of a low boiling hydrocarbon material such as liquid propylene yielding a temperature of approximately −40° C., or solid carbon dioxide yielding a temperature of approximately −78° C., or liquid ethane yielding a temperature of approximately −88° C. or liquid ethylene yielding a temperature of approximately −103° C.

The mixture is then polymerized by the addition thereto of a Friedel-Crafts type catalyst at the low temperature. The polymerization reaction requires a relatively large quantity of a relatively powerful catalyst. The catalyst, accordingly, may consist of an approximately equal volume of aluminum chloride in solution in a low-freezing, non-complex forming solvent such as ethyl or methyl chloride or carbon disulfide or the like. Alternatively, a saturated solution of boron trifluoride in liquid ethane or ethylene may be used, especially if too high a molecular weight is not desired. Alternatively, also, a relatively large quantity of finely powdered solid aluminum bromo chloride, $Al_2Br_5Cl$, may be used since this compound dissolves quite readily in the liquid reaction mixture, especially in the presence of a hydrocarbon diluent refrigerant as above outlined. Alternatively, the aluminum chlor-bromide may be dissolved in an additional portion of refrigerant or in a portion of other suitable diluent. Alternatively, liquid titanium tetrachloride may also be used, especially when it is used in relatively large proportions, since it is mixable with the olefinic material in almost any proportion.

Thus, for the catalyst, any Friedel-Crafts catalyst as disclosed by N. O. Calloway in his article on "The Friedel-Crafts Synthesis," printed in the issue of "Chemical Review," published for the American Chemical Society at Baltimore in 1935, in volume XVII No. 3, the article beginning on page 327, the list being particularly well-shown on page 375, may be used. It is, however, essential that the catalyst be either readily soluble in the reaction mixture or that it be brought into relatively concentrated solution in order to be added in relatively large quantity to the reaction mixture. (That is, solid, powdered aluminum chloride is not sufficiently soluble in the reaction mixture to permit polymerization.)

When the catalyst is used in solution in a low-freezing, non-complex-forming solvent, the solvent may consist of an alkyl mono or poly halogen substituted compound up to 5 or 6 carbon atoms, provided it is liquid at a temperature below the freezing point of water, thereby being low-freezing; and can be volatilized away from the catalyst substance without more than 1 or 2 degrees rise in boiling point above the normal boiling point of the pure solvent, thereby being non-complex forming. With some catalysts, any of the lower hydrocarbons having freezing points below 0° C., especially the aliphatic hydrocarbons, are useful, and various other substances, including carbon disulfide and its analogues and homologues are also useful as the catalyst solvent.

The catalyst is added to the olefinic material and well stirred in to obtain a homogeneous mixture. The reaction begins promptly, within from 5 seconds to 5 minutes, and usually is substantially complete in from 10 minutes to 2 hours, usually within 30 minutes.

The amount of Friedel-Crafts catalyst required for the reaction varies from an amount equal to 1 or 5% of the amount of olefinic material to be polymerized, up to 25 to 35% of the amount of olefinic material to be polymerized, depending upon the power of the catalyst and the amount of solvent, diluent and refrigerant present. The amount of catalyst solvent, if used, and the amount of diluent or diluent refrigerant, if used, preferably is kept to a minimum in order to avoid as much as possible dilution of the reaction mixture.

With propylene of ordinary purity, ranging from 85% to 98% pure, and 0.5% or more of the diolefin or multi-olefin, the maximum obtainable molecular weight is usually about 20,000, and by the use of smaller amounts of catalyst and the presence of diluents or diluent refrigerants, the molecular weight is readily brought down to values considerably lower than 20,000, the usual molecular weight being in the neighborhood of 5000 to 10,000.

In preparing the composition of the invention, the butadiene-styrene type polymer is placed on the double roll mill and milled briefly.

Usually it will not "band" in less than 5 to 8 or 9 minutes. Accordingly, as soon as the polymer is all in the bite of the rolls, an appropriate amount of the propylene polymer as above described is added. Usually it is preferable to add the polymer in small portions in order to avoid destroying the grip of the rolls on the polymer, and even the first small portion of polymer exerts a sufficient softening action on the styrene-type emulsion polymer to make it band quite quickly. The addition of the propylene copolymer is continued in small portions until the desired amount has been added. The addition of the propylene polymer may occupy from 5 to 20 minutes, depending upon the amount and the character both of the emulsion polymer and of the propylene copolymer as well as the skill of the workman who is making the addition. When the propylene copolymer has been added, the other compounding ingredients, including zinc oxide, stearic acid, carbon black, sulfur and the accelerator may be added in the usual manner, whereupon the polymer compound may be further processed such as by calendering or extruding to prepare it for the curing step.

The compound polymer is then cured in the usual way to yield the desired structural article.

It may be noted that the use of the propylene polymer greatly shortens the banding time, reduces the amount of power required for milling, very greatly reduces the time required to complete the preparation of the compound, greatly improves the tackiness of the compound, permitting much more simple methods for plying, calendering, extruding and the like. Furthermore, the presence of the propylene polymer does not interfere in any way with the vulcanizing reaction. The vulcanized polymer further shows a reduction in modulus which may be on the order of half, and an increase in elongation at break which may range from 50% to nearly 100%. The tensile strength may be somewhat reduced but the reduction in tensile strength usually is more than compensated for by the improvement in modulus and elongation. In consequence, the material is much superior for tube and tire construction especially because of the better elongation, better plying, better calendering and extruding and the like. In addition, the polymer, after the vulcanization, is firmly bound into the styrene-type polymer molecule and while the cured polymer will swell in hydrocarbon liquids, little or none of the softening oil is extracted soaking in gasoline.

EXAMPLE 1

A polymer was prepared by mixing together 98 parts of propylene having a purity of approximately 96% with 2 parts of dimethyl butadiene having a purity of approximately 96%. The mixture was cooled by the addition of a substantial quantity of solid carbon dioxide. For catalyst, approximately 5% by weight of $AlBr_2Cl$ (based on the weight of the polymerization mixture) was used, added to the cold propylene mixture in the form of a finely powdered solid. The material was stirred vigorously until the catalyst was well and substantially completely dissolved. The material was then allowed to stand, with moderate stirring, for 30 minutes. At the end of this time approximately 88% of the propylene-dimethyl-butadiene mixture had polymerized. The residual solid carbon dioxide was allowed to weather-off during the reaction time and at the end of the reaction time the residual material was thrown into water to hydrolize and remove as much as possible of the catalyst. The polymer was recovered in the form of moderately heavy, water-white oil. This polymer may be a more or less heavy oil, and may range from a moderately heavy oil up to a semi-solid, sticky substance. Prepared as above-described, the polymer was found to have a molecular weight of approximately 2980 as determined by the Staudinger method. Its viscosity and viscosity index are shown on the following table:

| SSU Vis., @ 100° F. | SSU Vis., @ 210° F. | Viscosity Index |
|---|---|---|
| 359 | 52 | 60 |
|  | 52 |  |

Similarly, a sample of "Buna S," the emulsion copolymer of butadiene and styrene prepared as above-described from 70 parts of butadiene and 30 parts of styrene was divided into three parts which were separately compounded according to the following recipe:

| | | | |
|---|---|---|---|
| "Buna" | 100.0 | 100.0 | 100.0 |
| Copolymer | | 10.0 | 20.0 |
| Zinc Oxide | 5.0 | 5.0 | 5.0 |
| EPC Black | 45.0 | 45.0 | 45.0 |
| Monex | 0.4 | 0.4 | 0.4 |
| Sulfur | 1.5 | 1.5 | 1.5 |
| Time to Add the Copolymer | | 9 mins. | 15 mins |

It will be noted that the first column of this recipe contains no softener, the second column contains 10 parts or 10% on the Buna of propylene copolymer as above outlined and the third column contains 20 parts of the copolymer. It may be further noted that the time to add the copolymer is substantially less than the normal milling time of the Buna alone which runs from 20 to 30 minutes.

After the respective portions of compound were fully prepared, Mooney viscosity measurements were made upon the resulting compounds and the following values were obtained.

Mooney vis. @ 212° F.:
1½ minute runs _____ 84   60   34
5 minute runs _____ 74   53   31

Also, determinations were made for the Williams plasticity and recovery values which were found to be as follows:

Williams plasticity
recovery 5/70 ___ 209–40   174–35   138–16

Each compound was then divided into four portions which were placed in molds and cured at 287° F. for 15, 30, 60 and 120 minutes respectively. Determinations were then made on samples for the tensile strength, modulus at 300% elongation and the elongation at break. The results are shown in the following table:

| | Tensile Strength | Modulus | Elongation | Tensile Strength | Modulus | Elongation | Tensile Strength | Modulus | Elongation |
|---|---|---|---|---|---|---|---|---|---|
| Cure 15' @ 287° F | 210 | 160 | 545 | 105 | 105 | 505 | 90 | 90 | 485 |
| Cure 30' @ 287° F | 2,535 | 1,090 | 565 | 1,810 | 575 | 725 | 1,085 | 275 | 785 |
| Cure 60' @ 287° F | 2,870 | 1,480 | 495 | 2,040 | 855 | 530 | 1,395 | 520 | 635 |
| Cure 120' @ 287° F | 2,875 | 1,500 | 475 | 2,125 | 835 | 570 | 1,565 | 540 | 580 |

It will be noted that the presence of the copolymer markedly reduces the modulus at any curing time, and after the 15 minutes curing time, substantially increases the elongation at break (the low elongation at break for the 15 minute curing indicates that the material is very much undercured).

The increase in elongation very greatly improves the performance of the polymer both in inner tubes and in tire casings, resulting in much better resistance to wear and much better resistance to unusual road shocks.

It may be noted, further, that the polymer is much more resistant to thermal breakdown than is the case with other analogous polymers. In comparison to polyisobutylene, for instance, the breakdown resistance of propylene polymer is much higher as is shown by the following table:

*Thermal breakdown at 300° F.*

| Hours of Test | M. Wt. of Polybutene, Exp. No. 176–146–1 on 5/13/43 | M. Wt. of Polypropylene, Exp. No. 176–146–2 on 1/3/45 |
|---|---|---|
| 0 | 14,000 | 14,000 |
| 40 | 13,000 | 13,880 |
| 80 | 12,100 | 13,800 |
| 120 | 11,200 | 13,700 |
| 160 | 11,000 | 13,500 |
| 200 | 10,000 | 13,500 |
| 240 | 9,000 | 13,400 |
| 280 | 8,500 | 13,400 |
| 320 | 7,500 | 13,000 |
| 360 | 7,000 | 13,000 |

This property of resistance to thermal breakdown is characteristic of the particular polymer prepared as above described as is shown in the following table:

*Thermal breakdown at 300° F.*

| Hours of Test | M. Wt. of Staudinger Copolymer |
|---|---|
| 0 | 3,000 |
| 360 | 2,880 |

These results are indicative of the much greater durability of the propylene copolymer when compounded into Buna and the much higher resistance to thermal breakdown in tires run at high speed and heavy loads.

EXAMPLE 2

A copolymer of propylene and dimethyl butadiene containing 98% propylene and 2% dimethyl butadiene was prepared with a molecular weight of approximately 5,000; as a very heavy, almost semi-solid oil, and was used as the softener in a sample of "Buna-S" prepared by emulsion copolymerization of 76 parts of butadiene with 24 parts of styrene as above described. The two polymers were compounded with zinc oxide, carbon black, sulfur and accelerator according to the following recipe:

| | Parts |
|---|---|
| Buna | 100 |
| Propylene copolymer | 10 |
| Zinc oxide | 5 |
| Carbon black | 45 |
| Sulfur | 1.5 |
| Monex (tetramethylthiuram monosulfide) | 0.4 |

This compound was readily prepared by placing the Buna on the double roll mill and adding the propylene copolymer in successive small portions as rapidly as the Buna would absorb them without losing adhesion to the rolls. Enough propylene polymer could be added in three minutes to cause the Buna to "band" nicely on the mill, and the addition of the 10 parts was complete in approximately 7 minutes. The other substances were then added much more rapidly than is usually possible and were much more rapidly and thoroughly dispersed than is ordinarily possible.

The finished compound showed a William plasticity and recovery under the 5 kg. weight at 70° C. of 116-16; and a Mooney viscosity at 212° F. of 51. The "tack" was, according to rubber standards, fair.

Four portions of the polymer were separately cured in test slabs for 15, 30, 45 and 60 minutes at 287° F. and the tensile strength, elongation at break, and modulus were determined for the four samples to yield the following inspection record:

| Cure Time | Tensile | Elongation | Modulus |
|---|---|---|---|
| 15′ @ 287° F | 140 | 690 | 90 |
| 30′ @ 287° F | 1,840 | 630 | 610 |
| 45′ @ 287° F | 2,180 | 590 | 780 |
| 60′ @ 287° F | 2,200 | 560 | 900 |

These results further show the efficiency of this material as plasticizer and show the excellent results for elongation, tensile strength and modulus.

EXAMPLE 3

A series of comparative tests on a sample of Buna using a variety of plasticizers were made to show the relative effectiveness. The plasticizers used were Petrolatum C; a copolymer of propylene and butadiene according to the present invention; Ennjay 110 Asphalt; and polybutene of 3,000 molecular weight. All of these materials except the copolymer are well known materials which have been frequently suggested as softeners for Buna.

The copolymer of propylene and butadiene was made as above described and contained approximately 3% butadiene with 97% propylene. It was copolymerized at the temperature of boiling methyl chloride, approximately −23° C., by the use of aluminum chloride in saturated solution in methyl chloride, approximately 5% of aluminum chloride on the amount of olefin being used.

A series of compounds of Buna were made up according to the following base recipe:

| | Parts |
|---|---|
| Buna | 100 |
| Zinc oxide | 5 |
| Carbon black | 45 |
| Sulfur | 1.5 |
| Monex | 0.4 |
| Plasticizer | 10 |

As a control, one compound was prepared without plasticizer and four compounds were prepared, respectively, with Petrolatum C, the propylene copolymer of the present invention, the Ennjay 110 Asphalt and the polybutene.

Tests of the several compounds before curing yielded the following data:

| Plasticizer | Control | Petrolatum C | Propylene made at B. P. of MeClAlCl₃ Cat. | Ennjay 110 Asphalt | Polybutene 3,000 M. Wt. |
|---|---|---|---|---|---|
| Williams, Rec. 5 Kg. @ 70° C | 123-16 | 101-7 | 106-8 | 99-2 | 109-12 |
| Mooney @ 212° F | 64 | 43 | 43 | 41 | 48 |
| Extrusion, Ins./Min | 36.25 | 44.75 | 56 | 54 | 47 |
| Gms./Min | 79.8 | 97.75 | 118 | 118.4 | 98.4 |
| Gms./In | 2.20 | 2.28 | 2.11 | 2.19 | 2.10 |
| Tack | Very Slight | Very Slight | Fair | Fair | Slight |

These results show the valuable improvement in extrudability and lack of "swell" during extrusion obtainable by the polymer softener of the present invention.

Portions of each of the compounds were then cured in test slabs and determinations made of the tensile strength, elongation at break, modulus at 300% elongation and Shore hardness to yield the following inspection record.

| Plasticizer | Control | Petrolatum C | Propylene made at B. P. + of MeCl-AlCl₃ Cat. | Ennjay 110 Asphalt | Polybutene, 3,000 M. Wt. |
|---|---|---|---|---|---|
| Tensile — Elongation Modulus @ 300%— Shore: | | | | | |
| 15' | 190-700 90-45 | 80-800 50-45 | 100-730 50-50 | 390-1100+ 110-45 | 100-870 50-43 |
| 30' | 2510-590 890-55 | 1680-720 420-50 | 1840-660 520-60 | 2380-850 370-50 | 2070-720 496-50 |
| 45' | 2900-570 1160-60 | 2130-650 610-50 | 2230-630 730-55 | 2610-780 500-55 | 2390-650 720-55 |
| 60' | 3000-540 1260-60 | 2250-650 660-55 | 2430-610 870-55 | 2840-780 550-55 | 2300-530 810-55 |

These results further show the excellent plasticizing and softening effect of the copolymer of the present invention. It may be further noted that, especially in the higher molecular weights, much less reduction in tensile strength of the Buna occurs from the presence of the plasticizer than is characteristic of almost any other softener, which apparently is due to a cross linkage during vulcanization which doubly links the molecules of polymer by sulfur to this linear chain Buna polymer.

Thus, the composition of the invention provides a new composition of material containing the copolymer of a polyolefin such as butadiene with a styrene, in combination with a polymer of propylene with a multi-olefin which is covulcanizable therewith; which, before vulcanizing, softens the material, improves its milling properties and tackiness; and after curing, improves the elongation at break without detrimental reduction in ultimate tensile strength.

While there are above disclosed but a limited number of embodiments of the present invention, it is possible to provide still other embodiments without departing from the inventive concept therein disclosed and it is therefore desired that only such limitations be improved upon. The appended claims as are stated therein are required by the prior art.

The invention claimed is:

1. The method of softening a copolymer of butadiene and styrene containing 50% to 80% of butadiene comprising the steps in combination of mixing thereinto a copolymer of propylene with butadiene, having a molecular weight between 2,000 and 20,000 and an iodine number between 5 and 50; in the range between 0.1% to 25%; prepared by the steps of mixing together from 90 parts to 99.5 parts of propylene with from 10 parts to 0.5 part of the butadiene, and polymerizing the material at a temperature within the range between —40° C. and —103° C. by the application thereof of 1% to 35% of a saturated solution of the Friedel-Crafts catalyst in a low freezing non-complex-forming solvent.

2. The method of softening a copolymer of butadiene and styrene containing 50% to 80% of butadiene comprising the steps in combination of mixing thereinto a copolymer of propylene with isoprene, having a molecular weight between 2,000 and 20,000 and an iodine number between 5 and 50; in the range between 0.1% to 25%; prepared by the steps of mixing together from 90 parts to 99.5 parts of propylene with from 10 parts to 0.5 part of isoprene, and polymerizing the material at a temperature within the range between —40° C. and —103° C. by the application thereto of 1% to 35% of a saturated solution of the Friedel-Crafts catalyst in a low freezing non-complex-forming solvent.

3. The method of softening a copolymer of butadiene and styrene containing 50% to 80% of butadiene comprising the steps in combination of mixing thereinto a copolymer of propylene with dimethyl butadiene, having a molecular weight between 2,000 and 20,000 and an iodine number between 5 and 50; in the range between 0.1% to 25%; prepared by the steps of mixing together from 90 parts to 99.5 parts of propylene with from 10 parts to 0.5 part of the butadiene, and polymerizing the material at a temperature within the range between —40° C. and —103° C. by the application thereto of 1% to 35% of a saturated solution of the Friedel-Crafts catalyst in a low freezing non-complex-forming solvent.

4. The method of softening a copolymer of butadiene and styrene, containing 50% to 80% of butadiene comprising the steps in combination of mixing thereinto a copolymer of propylene with a diolefin having from 4 to 6 inclusive carbon atoms per molecule; having a molecular weight between 2,000 and 20,000 and an iodine number between 5 and 50; in the range between 0.1% and 25%; prepared by the steps of mixing together from 90 parts to 99.5 parts of propylene with from 10 parts to 0.5 part of the diolefin, and polymerizing the material at a temperature within the range between —40° C. and —103° C. by the application thereto of 1% to 35% of a saturated solution of the Friedel-Crafts catalyst in a low freezing non-complex-forming solvent.

DAVID W. YOUNG.
HARRIS D. HINELINE.

REFERENCES CITED

The following references are of record in the file of this patent:

UNITED STATES PATENTS

| Number | Name | Date |
|---|---|---|
| 2,213,423 | Wiezevich | Sept. 3, 1940 |
| 2,243,658 | Thomas et al. | May 27, 1941 |
| 2,307,037 | Gumlich et al. | Jan. 5, 1943 |